United States Patent
Meng et al.

(10) Patent No.: US 8,321,223 B2
(45) Date of Patent: Nov. 27, 2012

(54) METHOD AND SYSTEM FOR SPEECH SYNTHESIS USING DYNAMICALLY UPDATED ACOUSTIC UNIT SETS

(75) Inventors: Fan Ping Meng, Beijing (CN); Yong Qin, Beijing (CN); Qin Shi, Beijing (CN); Zhiwei Shuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 12/472,724

(22) Filed: May 27, 2009

(65) Prior Publication Data

US 2009/0299746 A1    Dec. 3, 2009

(30) Foreign Application Priority Data

May 28, 2008    (CN) .................. 2008 1 00098474

(51) Int. Cl.
*G10L 13/08* (2006.01)
(52) U.S. Cl. .................................. 704/260
(58) Field of Classification Search ............ 704/260
See application file for complete search history.

(56) References Cited

U.S. PATENT DOCUMENTS

| | | | |
|---|---|---|---|
| 6,625,576 B2 * | 9/2003 | Kochanski et al. | 704/260 |
| 6,810,379 B1 * | 10/2004 | Vermeulen et al. | 704/260 |
| 7,761,299 B1 * | 7/2010 | Beutnagel et al. | 704/258 |
| 7,983,919 B2 * | 7/2011 | Conkie | 704/260 |
| 2005/0203727 A1 | 9/2005 | Heiner et al. | |
| 2006/0287861 A1 | 12/2006 | Fischer et al. | |

FOREIGN PATENT DOCUMENTS

| | | |
|---|---|---|
| JP | 2003-233386 | 8/2003 |
| WO | WO2006128480 A1 | 12/2006 |

\* cited by examiner

*Primary Examiner* — Susan McFadden
(74) *Attorney, Agent, or Firm* — Gail H Zarick; Anne Vachon Dougherty

(57) ABSTRACT

A method for performing speech synthesis on textual content at a client. The method includes the steps of: performing speech synthesis on the textual content based on a current acoustical unit set $S_{current}$ in a corpus at the client; analyzing the textual content and generating a list of target units with corresponding context features, selecting multiple acoustical unit candidates for each target unit according to the context features based on an acoustical unit set $S_{total}$ that is more plentiful than the current acoustical unit set $S_{current}$ in the corpus at the client, and determining acoustical units suitable for speech synthesis for the textual content according to the multiple unit candidates; and updating the current acoustical unit set $S_{current}$ in the corpus at the client based on the determined acoustical units.

14 Claims, 5 Drawing Sheets

METHOD AND SYSTEM FOR SPEECH SYNTHESIS USING DYNAMICALLY UPDATED ACOUSTIC UNIT SETS

CROSS REFERENCE TO RELATED APPLICATION

This application claims priority under 35 U.S.C. 119 from Chinese Patent Application 2008100098474.9, filed May 28, 2008, the entire contents of which are incorporated herein.

BACKGROUND OF THE INVENTION

1. Field of the Invention

The present invention generally relates to text to speech (TTS) technology. More particularly, the present invention relates to a method and system for performing speech synthesis of textual content at a client.

2. Description of Related Art

A text to speech (TTS) system is a widely used technology for people to access required information via speech. A typical application is to change a textual content which a user can access via the Internet to speech at a client such as a desktop computer, a laptop computer or a handheld device such as a mobile phone, a personal digital assistant or the like. Thus, the user can get information without reading the text. For such an application, the user needs to load a TTS system into his client. Now, more and more users tend to download a TTS system via the Internet instead of using a copy recorded on a storage medium.

Currently, most TTS systems perform speech synthesis based on the selection and concatenation of acoustical units. The speech synthesis based on the selection and concatenation of units requires a large amount of acoustical units in order to get satisfactory speech. For example, an IBM Chinese TTS system uses 25000 sentences as a corpus to synthesize good-quality speech, which is about 4 GB. Of course, these acoustical units can be compressed to 200 MB with some speech coding algorithms without hurting the speech quality too much. However, it is very big for users, who download speech data via a network, to download the speech data of 200 MB at a time. Users have to wait for quite a long time to begin to use the speech data.

In view of the problem outlined above there have been proposals to cut down a corpus to the greatest extent to get a smaller TTS system, e.g. 20 MB, for speech synthesis on the premise of successfully synthesizing various textual contents and ensuring an acceptable speech quality. In this case, users only need to wait for a very short time (for example, the time for downloading 20 MB data) to begin to use the TTS system. However, since the corpus of the downloaded TTS system is limited, the speech synthesis quality gotten by users during using the TTS system is rather poor. From the angle of users' use psychology, such a poor speech synthesis quality might be acceptable in a short time at the beginning of using the system but will be unsatisfactory after a long time of use.

European patent application, WO06128480A1, discloses a method and system for providing speech synthesis on user terminals over a communication network. In this patent, a basic database for speech synthesis is first downloaded on a user terminal, and multiple incremental corpus databases are generated on the TTS server side ahead of time according to possible topics, e.g. economics, sports, comics and so on. When a user accesses a textual content with this TTS system, the system extracts the topic of the textual content, selects a corresponding incremental corpus database according to the topic and adds the incremental corpus database to the basic database on the user client for speech synthesis of the textual content. Compared with the previous solution, this solution enables users to download a smaller TTS system quickly and begin to use it soon. With this solution, incremental databases can be increased little by little, so that the speech synthesis quality is improved continuously and users' satisfaction degree enhanced.

Based on this solution, each client needs to assign one of the existing contexts (topics) (e.g. economics, sports, comics and so on) to the text to be synthesized, selects an incremental corpus database existing on the TTS server side (for example, selects an incremental corpus database such as economics, sports, comics and so on) and then downloads the incremental corpus database.

There are some limitations in the technical solution disclosed by the European patent application WO06128480A1. This is because, during actual speech synthesis, synthesizing contents of a similar context (topic) might require a completely different set of acoustical units (syllables). For example, the text with the topic of sports might be about swimming or basketball, whereas these two actual contexts have an enormous difference in acoustical units during speech synthesis. Therefore, such a solution as assigning a specific context (topic) to the text so as to download a pre-generated specific corpus according to the specific context is inaccurate for TTS systems based on the selection and concatenation. Accordingly, to download a corpus database according to a topic with this solution will not enable a client to effectively improve the speech synthesis quality, and users still might be unsatisfied with such enhancement of the synthesis quality.

Therefore, there is a need for a TTS system-based text to speech solution and method, which can not only support a user to download and use a Text to speech system in a short time but also effectively improve the speech synthesis quality with the further use of the system by the user, thereby enhancing the text to speech service performance of the system.

SUMMARY OF THE INVENTION

The present invention provides a method and system for performing speech synthesis of textual content at a client, which not only supports a user to download and use a text to speech system in a short time, but also adaptively improves the speech synthesis quality as the user further uses the system. As a result, the text to speech service performance of the system is enhanced.

According to an aspect of the present invention provides a method for performing speech synthesis of textual content at a client data processing system. The method includes the steps of: performing speech synthesis of the textual content based on a current acoustical unit set in a corpus at the client; analyzing the textual content and generating a list of target units with corresponding context features; selecting multiple acoustical unit candidates for each target unit according to the context features based on an acoustical unit set that is more plentiful than the current acoustical unit set in the corpus at said client; determining acoustical units suitable for speech synthesis for the textual content according to the multiple unit candidates; and updating the current acoustical unit set in the corpus at the client based on the determined acoustical units.

According to another aspect of the present invention, there is provided a system for enabling speech synthesis of textual content at a client. The system includes: a speech synthesizer configured to perform speech synthesis of the textual content based on a current acoustical unit set in a corpus on the client; analysis means for analyzing the textual content and generating a list of target units with corresponding context features; selection means for selecting multiple acoustical unit candidates for each target unit according to the context features based on an acoustical unit set that is more plentiful than the current acoustical unit set in the corpus at the client; determining means for determining acoustical units suitable for speech synthesis for the textual content according to the multiple unit candidates; and update means configured to update the current acoustical unit set in the corpus on the client based at the determined acoustical units.

BRIEF DESCRIPTION OF THE DRAWINGS

To illustrate features and advantages of embodiments of the present invention in detail, reference is made to the accompanying drawings where like or similar reference numerals designate the same or similar components throughout the figures and the description.

DESCRIPTION OF THE PREFERRED EMBODIMENTS

Figure 1:
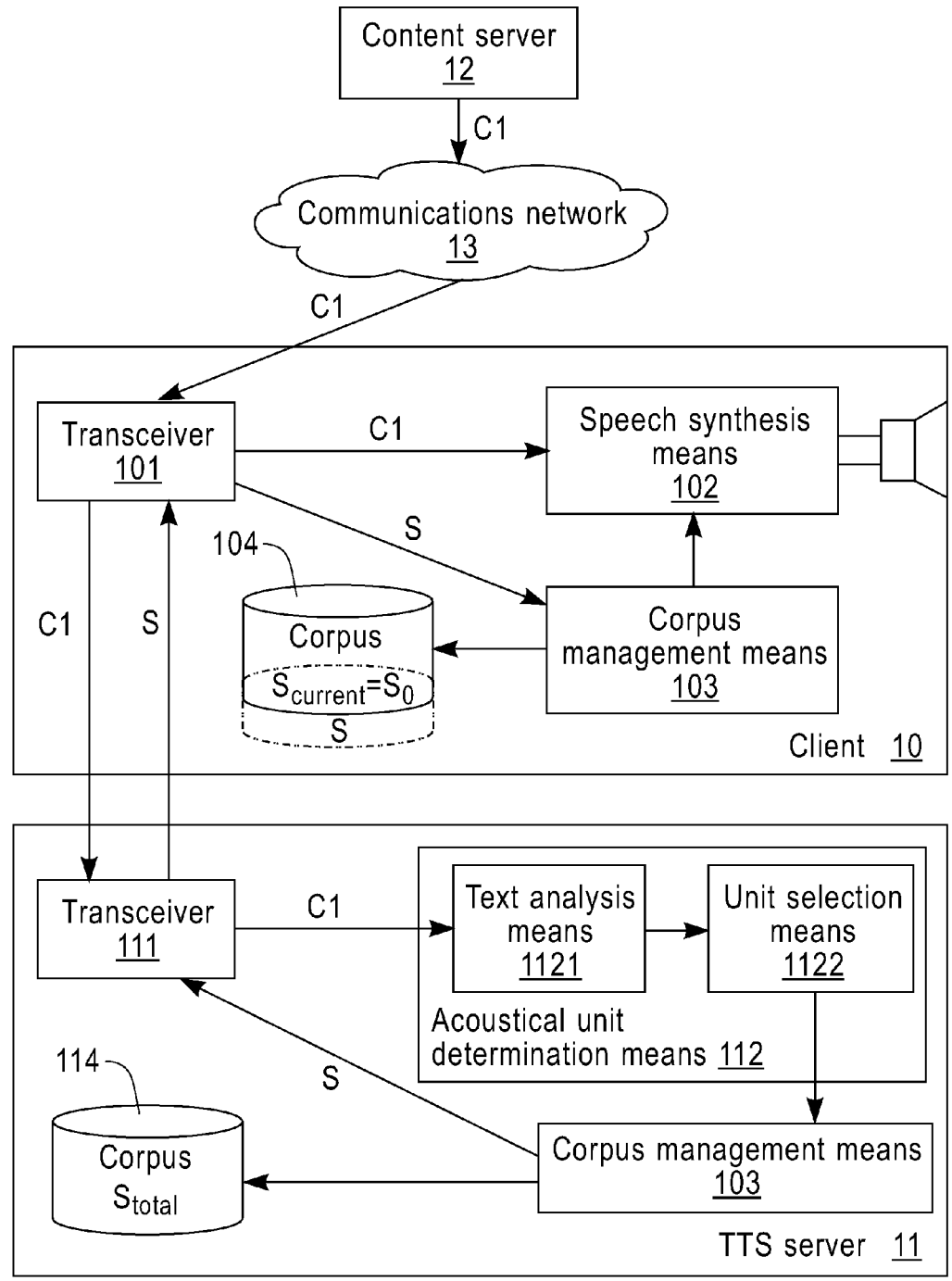
FIG. 1 schematically shows a system for performing speech synthesis to a textual content at a client according to an embodiment of the present invention.

The present invention supports a user to download and use a text to speech system in a short time. Since the present invention directly selects and downloads acoustical units that are most important for speech synthesis of the history textual content at the client, it enables the corpus with respect to the textual content to be downloaded and updated at the client more accurately. As the user further uses the system, the client can get an effective improvement in speech synthesis quality, so that the text to speech service performance is enhanced.

As described above, users cannot get a markedly improved quality of speech synthesis from text to speech being performed at a client with the existing technical approaches. This is because, although the existing technical solutions dynamically update an corpus database maintained by a client (e.g. by using incremental corpus databases according to topics), such update is based on preset contexts (topics), whereas it is inaccurate to select an incremental corpus database for speech synthesis depending on an artificially classified context, which can hardly adapt a corpus to a content to be synthesized currently.

The inventors of the present invention have noticed that when a user is performing speech synthesis at a client, and in particular, performing speech synthesis of network content text at a client, there is usually a higher correlation between a currently synthesized textual content and a previously synthesized textual content.

A principle of the present invention is: at the beginning, a user downloads into a client a smallest corpus which can ensure an acceptable speech quality, as a current corpus for the client to perform speech synthesis, so as to enable the user to perform speech synthesis of network textual content by using a TTS system as soon as possible; then, while the user is using the TTS system, an acoustical unit for a textual content to which speech synthesis has been performed, i.e., a history textual content, is selected based on a corpus (e.g. a total corpus maintained at the server side, a sub-corpus obtained from division according to a certain rule) which is more plentiful than the client's current corpus, wherein a better speech synthesis quality of the history textual content can usually be achieved from the speech synthesis based on the selected acoustical units; then, the client's current corpus is updated based on the selected acoustical units.

For example, a set of selected acoustical units that are not included in the client's current corpus is determined; the set is downloaded into the client; and the client's current corpus is updated to include all acoustical units that are selected for the history textual content, so that the client's updated corpus is then used for speech synthesis of a subsequent textual content. By repeating this procedure the client's current corpus can be made plentiful little by little according to the textual content (history textual content) to which speech synthesis has been performed, so that the speech synthesis quality is improved continuously and users' satisfaction degree enhanced.

A detailed description is given below of embodiments of the present invention with reference to the accompanying drawings.

Referring to FIG. 1, a system is shown for performing speech synthesis of textual content at a client according to an embodiment of the present invention. Reference numeral 10 denotes a client, which may be a user device needing to use the TTS functionality, such as a desktop, a laptop, a mobile phone, a personal digital assistant and so on; 11 denotes a TTS server, which may be any remote or proximal server capable of providing the client with TTS services; 12 denotes a content server, which may be any remote or proximal server capable of providing the client with all kinds of network content information; 13 denotes a communications network connecting respective devices, which may be a local area network, a wide area network, an intranet, the Internet and so on. In the TTS system shown in FIG. 1, multiple clients (only one client, namely client 10, is shown) are connected via communications network 13 to content server 12 to get network textual contents. The multiple clients can be connected to TTS server 11 either directly (as shown in FIG. 1) or via a communications network (not shown) so as to get services such as downloading the TTS system.

As shown in FIG. 1, client 10 includes transceiver 101, speech synthesis means 102, corpus management 103, and corpus 104. Client 10 communicates with the other network unit (server) via transceiver 101. Speech synthesis means 102 is for converting a textual content to speech based on the selection and concatenation of acoustical units in a current corpus and outputting the speech via a loudspeaker. Corpus management means 103 is for maintaining an index file of corpus 104 and managing the acquisition and update of acoustical units in corpus 104. Corpus 104 has a set of the client's local acoustical units stored for speech synthesis.

TTS server 11 includes: transceiver 111, acoustical unit determination means 112, corpus management means 113, and a corpus 114. TTS server 11 communicates with the other network unit (client) via transceiver 111. Acoustical unit determination means 112 is for determining an acoustical units set, which is used for updating a client's local corpus. Corpus management means 113 is for maintaining an index file of corpus 114 on the server side and managing the acquisition of acoustical units in corpus 114. Corpus 114 stores a set of the server's acoustical units. The server provides a subset or the universal set of the acoustical unit set to the client as the client's locally stored corpus. Therefore, corpus 114 at the server side usually has more plentiful acoustical resources than the client's locally stored corpus 104. According to an embodiment of the present invention, acoustical unit determination means 112 comprises text analysis means 1121 and unit selection means 1122. In one implementation, text analysis means 1121 is for analyzing a textual content and generating a list of target units with a corresponding context feature. Unit selection means 1122 determines acoustical unit candidates suitable for speech synthesis for target units of the textual content, based on corpus 113 on the TTS server side, so that an acoustical unit for speech synthesis can be selected from the acoustical unit candidates. TTS server 11 updates the client's current corpus based on the selected acoustical units.

A detailed description is given below to the operating procedure of each network element in the architecture shown in FIG. 1. For purposes of illustration, definitions are given for the following symbols:

1. $S_{current}$: an acoustical unit set for speech synthesis which is locally stored at the client, namely an acoustical unit set in a local corpus at the client.

2. $S_0$: an acoustical unit set which the client downloads from the TTS server in an initial state. In a preferred embodiment, $S_0$ may be a set of a small number of acoustical units required for implementing all kinds of textual to speech synthesis and ensuring a user-acceptable speech synthesis quality. When $S_0$ is downloaded into the client's corpus, $S_{current}$ equals $S_0$.

3. $S_{total}$: an acoustical unit set stored in a corpus on the TTS server. $S_{total}$ usually has more plentiful acoustical resources than $S_{current}$ locally stored at the client. That is to say, the client's corpus is a subset of the TTS server' s corpus, i.e., $S_{total} \supseteq S_{current}$. What needs to be pointed out here is that, although the acoustical unit set in the corpus on the TTS server is denoted as $S_{total}$, it is to be understood $S_{total}$ is relative to the subset $S_{current}$ maintained at the client. $S_{total}$ may be either the whole corpus maintained by the TTS server or a specified portion of the whole corpus maintained by the TTS server (e.g. a specific portion obtained by dividing the whole corpus according to a certain rule, etc.) so long as it has more plentiful acoustical resources than the client's corpus. It is understood by those skilled in the art upon reading of the illustration of the present invention that $S_{total}$ is preferably an acoustical unit set of the whole corpus maintained by the TTS server. In this manner, the speech synthesis quality at the client can be improved more effectively.

4. $S_A$: an acoustical unit set determined by the acoustical unit determination means to be downloaded into the client in order to enrich the client's corpus.

Illustration is given to the operating procedure of the system shown in FIG. 1 by means of concrete examples.

In an initial state, a user of client 10 starts the TTS service function, and client 10 downloads from TTS server 11 So as $S_{current}$ and stores it to local corpus 104 for speech synthesis.

Client 10 acquires a textual content C1 from content server 12 via communications network 13. And transceiver 101 of client 10 sends the received textual content C1 to speech synthesis means 102. Afterwards, speech synthesis means 102 gets, via corpus management means 103, acoustical units of $S_{current}$ (at this point, $S_{current}=S_0$) in corpus 104 to synthesize speech and outputs the speech via a loudspeaker. Speech synthesis means 102 may comprise respective functional modules required for speech synthesis based on TTS technology, including the text analysis means and the unit selection means for example. Operating principles and operating procedures of these functional modules are well known and can be implemented in any manner employed in a concatenate text to speech system. The description of the present invention only focuses on the function and effect of the speech synthesis means which are related to the present invention, and omits detailed implementations thereof. Different from the prior art, in the technical solution according to an embodiment of the present invention when the user gets synthesized speech of the textual content C1 based on the current acoustical unit set $S_{current}$ of corpus 104, client 10 sends the textual content C1 to TTS server 11 via transceiver 101 so as to adaptively update local corpus 104 on client 10.

On the TTS server 11 side, transceiver 111 receives the textual content C1 from client 10 and passes it to acoustical unit determination means 112. Similar to speech synthesis means of a traditional TTS system in terms of an operating principle and operating procedure, acoustical unit determination means 112 however does not perform actual speech synthesis but determines acoustical unit candidates through unit selection so as to update the corresponding client's corpus. In the embodiment shown in FIG. 1, acoustical unit determination means 112 comprises text analysis means 1121 and unit selection means 1122. Text analysis means 1121 analyzes the textual content C1 and generates a list of target units with corresponding context features. Unit selection means 1122 selects multiple acoustical unit candidates suitable for speech synthesis for target units of the textual content C1 based on $S_{total}$ in corpus 114. The unit selection may be implemented based on context features of target units, such as the current unit, position in the prosody word (head, middle or tail), position in the sentence, the left vowels, the right constants, etc. Since acoustical unit determination means 112 selects candidate acoustical units of the textual content C1 based on $S_{total}$ (which has more plentiful acoustical resources than the client's $S_{current}$), to perform speech synthesis of the textual content C1 by using the candidate acoustical units usually can have a better speech synthesis quality than such performance for C1 at the client. Acoustical unit determination means 112 determines an acoustical unit set to be used for updating the local corpus on client 10, based on a result from the unit selection. In one implementation, acoustical unit determination means 112 determines the set of all acoustical unit candidates directly as an acoustical unit set for updating the local corpus on client 10. Acoustical unit determination means 112 also can use an optimized ranking result of candidate units to determine an acoustical unit set for updating the local corpus on client 10. For example, multiple acoustical unit candidates for each target unit can be ranked all together or ranked separately (e.g. according to the number that each candidate acoustical unit has been selected), so as to determine an acoustical unit set for update. It is understood by those skilled in the art that although acoustical unit determination means 112 performs the unit selection procedure in the TTS system, it is not intended as actual speech synthesis. Therefore, the above operations of acoustical unit determination means 112 are preferably implemented based on a corpus index file (not shown in the figure) including property indices of all acoustical units of the corpus, without invoking actual audio waveforms of acoustical units stored in the corpus.

Next, acoustical unit determination means 112 notifies corpus management means 113 of the determined acoustical unit set. Corpus management means 113 gets corresponding acoustical units (audio waveforms) from corpus 114 on TTS server 11 so as to update local corpus 104 on client 10. Preferably, corpus management means 113 merely gets a set of acoustical units which belongs to the determined acoustical unit set and is not included in $S_{current}$ on client 10, i.e., $S_A$. In a concrete implementation the unit set $S_A$ can be determined by looking up a configuration file (not shown) of the client corpus maintained on TTS server 11. TTS server 11 sends $S_A$ via transceiver 111 to client 10 for corpus update. TTS server 10 can update the configuration file maintained by it for client 10 so as to record the configuration of updated corpus 104 on client 10.

Transceiver 101 of client 10 receives $S_A$ and sends it to local corpus management means 103 at client 10. Then, corpus management means 103 adds $S_A$ to corpus 104 so as to update corpus 104 to make $S_{current}=S_0+S_A$ and further update the index file of corpus 104.

When client 10 gets a new textual content, C2 (not shown), from content server 12 via communications network 13, speech synthesis will be implemented based on updated $S_{current}$, $(S_0+S_A)$ in corpus 104. Since there is usually a greater correlation between the currently synthesized textual content and a previously synthesized textual content, performing speech synthesis to C2 based on the corpus expanded for the unit selection of C1 usually can effectively enhance the speech synthesis quality. Similarly, C2 is also sent to TTS server 11 as a history textual content to determine $S_A$ for further updating the client's local corpus 104. This procedure of adaptively updating corpus 104 of client 10 is implemented in a cycle as the user uses the client TTS system continuously. Finally, the whole corpus on TTS server 11 is downloaded into client 10. In this manner, history textual contents for speech synthesis are supplemented little by little to the acoustical unit set of the client's corpus, so as to ensure the speech synthesis quality to be effectively improved at the client in a shorter time. Of course, conditions for terminating the adaptive update procedure can be artificially set in order to stop updating the client's corpus.

According to the embodiment shown in FIG. 1, the operation of determining, based on the history textual contents at the client, acoustical units to be updated is implemented at the TTS server side. In this embodiment, the TTS server manages the corpus update on each client in a centralized way and hence needs to perform the operation of determining acoustical units to be updated for each client. Obviously, the TTS server will bear a huge amount of computation, which increases the operating cost at the TTS server side.

As an alternative embodiment of the present invention, the operation of determining acoustical units to be updated for a client also can be locally implemented on each client in a distributed way. Description is given below of this embodiment with reference to FIG. 2.

Figure 2:
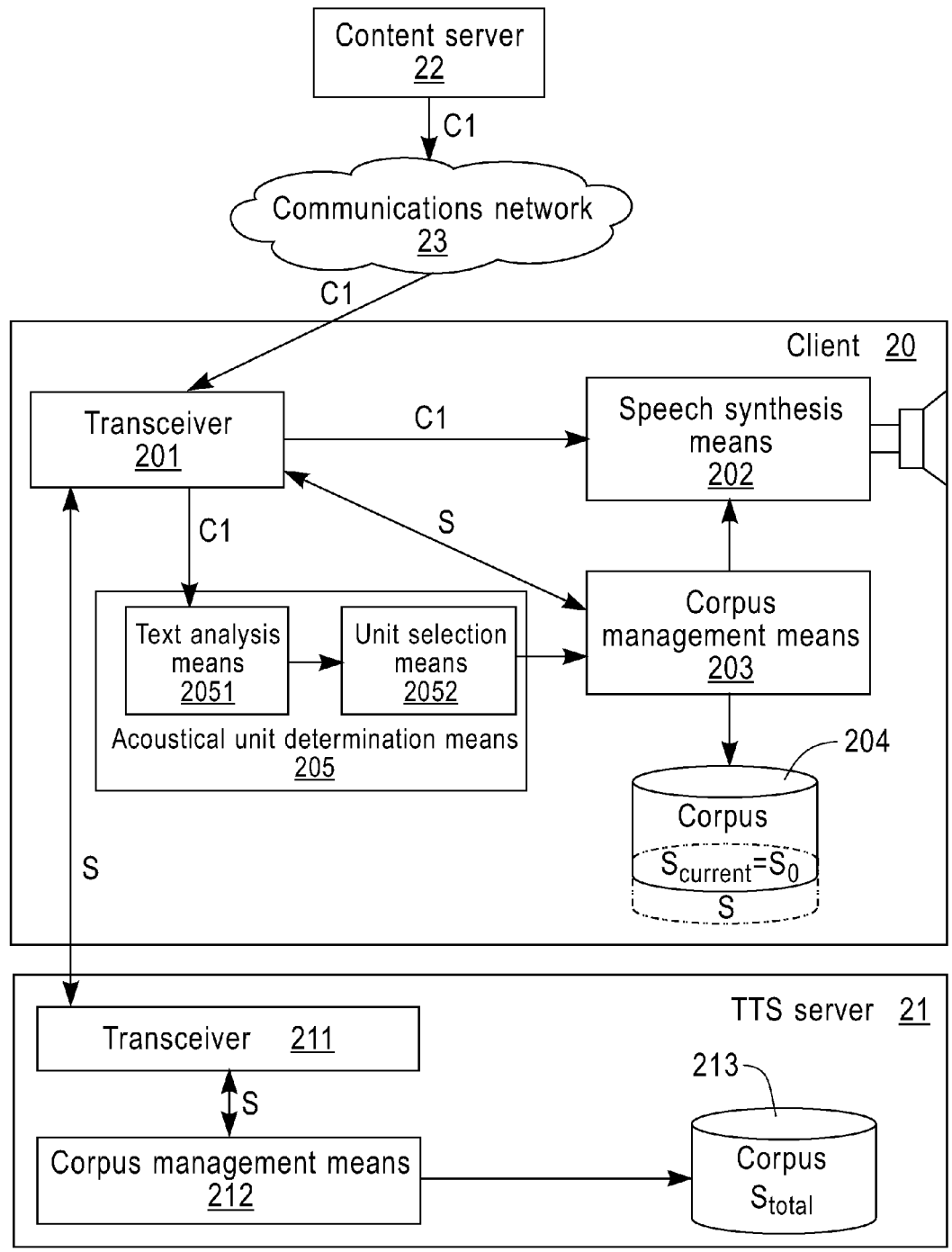
FIG. 2 schematically shows a system for performing speech synthesis to a textual content at a client according to another embodiment of the present invention.

FIG. 2 schematically shows a system for performing speech synthesis of textual content at a client according to another embodiment of the present invention. Reference numeral 20 denotes a client, which may be a user device needing to use the TTS functionality, such as a desktop, a laptop, a mobile phone, a personal digital assistant and so on; 21 denotes a TTS server, which may be any remote or proximal server capable of providing the client with TTS services; 22 denotes a content server, which may be any remote or proximal server capable of providing the client with all kinds of network content information; 23 denotes a communications network connecting respective devices, which may be a local area network, a wide area network, an intranet, the Internet and so on.

Like the TTS system shown in FIG. 1, in the TTS system shown in FIG. 2, multiple clients (only one client, namely client 20, is illustrated by way of example) are connected via communications network 23 to content server 12 to get network textual contents. The multiple clients can be connected to TTS server 21 either directly (as shown in FIG. 2) or via a communications network (not shown) so as to get services such as downloading the TTS system.

As shown in FIG. 2, client 20 comprises: transceiver 201, speech synthesis means 202, corpus management 203, a corpus 204 and, in particular, acoustical unit determination means 205. With the construction and function being similar to those of acoustical unit determination means 112 of TTS server 10 in the embodiment shown in FIG. 1, acoustical unit determination means 205 may comprise text analysis means 2051 and unit selection means 2052. TTS server 21 comprises transceiver 211, corpus management means 213 and a corpus 214.

A detailed description is given below to the operating procedure of each network element of the architecture shown in FIG. 2. For purposes of illustration, the symbols $S_{current}$, $S_0$, $S_{total}$ and $S_A$ are introduced with reference to the foregoing definitions.

Illustration is given of the operating procedure of the system shown in FIG. 2 by means of concrete examples.

In an initial state, a user of client 20 starts the TTS service function, and client 20 downloads, from TTS server 11, So as $S_{current}$ and stores it to local corpus 204 for speech synthesis.

Client 20 acquires a textual content C1 from content server 22 via communications network 23. Transceiver 201 of client 20 sends the received textual content C1 to speech synthesis means 202. Afterwards, speech synthesis means 202 gets via corpus management means 203 acoustical units of $S_{current}$ (at this point, $S_{current}=S_0$) in corpus 204 to synthesize speech and outputs the speech via a loudspeaker. The operating principle and operating procedure of speech synthesis means 202 are well known and can be implemented in any manner employed in a concatenate text to speech system.

In contrast to the embodiment described with reference to FIG. 1, when the user gets synthesized speech of the textual content C1 based on the current acoustical unit set $S_{current}$ in corpus 204, acoustical unit determination means 205 of client 20 further determines an acoustical unit set for updating corpus 204 on client 20 based on the textual content C1.

Similar to speech synthesis means of a traditional TTS system in terms of an operating principle and operating procedure, acoustical unit determination means 205 however does not perform actual speech synthesis but determines acoustical unit candidates through unit selection to update the corpus on a corresponding client.

In acoustical unit determination means 205, text analysis means 2051 analyzes the textual content C1 and generates a list of target units with corresponding context features. Unit selection means 2052 selects multiple acoustical unit candidates suitable for speech synthesis for target units of the textual content C1 based on $S_{total}$ in corpus 214 on TTS server 21. What should be pointed out here is that client 20 may get an index file of its corpus 214 from TTS server 21, which may include property indices of all acoustical units in $S_{total}$. As a result, acoustical unit determination means 205 can execute the determination computation based on $S_{total}$ without invoking actual audio waveforms of acoustical units in $S_{total}$.

Acoustical unit determination means 205 determines an acoustical unit set to be used for updating the local corpus on client 10, based on a result from the unit selection. In one implementation, acoustical unit determination means 205 determines the set of all acoustical unit candidates directly as an acoustical unit set for updating the local corpus on client 20. Acoustical unit determination means 205 also can use an optimized ranking result of candidate units to determine an acoustical unit set for updating the local corpus on client 20. For example, to determine an acoustical unit set for update, multiple acoustical unit candidates for each target unit can be ranked all together or ranked separately (e.g. according to the number that each candidate acoustical unit has been selected).

Next, acoustical unit determination means 205 notifies corpus management means 203 of the determined acoustical unit set. Corpus management means 203 gets a set of acoustical units which belongs to the determined acoustical unit set and is not included in $S_{current}$ on client 20, i.e., $S_A$. Corpus management means 203 can determine an index file of $S_A$ by looking up the index file (index file of $S_{current}$) of the client's corpus. Then, client 20 sends the index file of $S_A$ via transceiver 201 to TTS server 21.

At the side of TTS server 21, transceiver 211 receives from client 20 the index file corresponding to $S_A$ and passes it to corpus management means 213. Then corpus management means 213 gets $S_A$ from corpus 214 ($S_{total}$), thereby getting audio waveforms of acoustical units in $S_A$. $S_A$ gotten by transceiver 211 is sent to client 20.

At the side of client 20, transceiver 210 passes the received $S_A$ to corpus management means 203. And corpus management means 203 adds $S_A$ to corpus 204 so as to update corpus 204 to make $S_{current}=S_0+S_A$ and further update the index file of corpus 204 being maintained.

When a client 20 gets a new textual content, C2 (not shown), from content server 22 via communications network 23, speech synthesis will be implemented based on updated $S_{current}$, (i.e., $S_0+S_A$) in corpus 204. Since there is usually a greater correlation between the currently synthesized textual content and a previously synthesized textual content, to perform speech synthesis to C2 based on the corpus expanded for the unit selection of C1 usually can effectively enhance the speech synthesis quality.

Similarly, acoustical unit determination means 205 of client 20 determines $S_A$ for further updating the client's local corpus 204 based on C2 that serves as a history textual content. Client 20 downloads $S_A$ from TTS server 21, and updates corpus 204 once again for speech synthesis of a subsequent new textual content. This procedure of adaptively updating corpus 204 on client 20 is implemented in a cycle as the user uses the client TTS system.

Finally, the whole corpus on TTS server 21 is downloaded into client 20. In this manner, history textual contents for speech synthesis are supplemented little by little to the acoustical unit set of the client's corpus, so as to ensure the speech synthesis quality to be effectively improved at the client in a shorter time. Of course, conditions for terminating the adaptive update procedure can be artificially set in order to stop updating the client's corpus.

Figure 3:
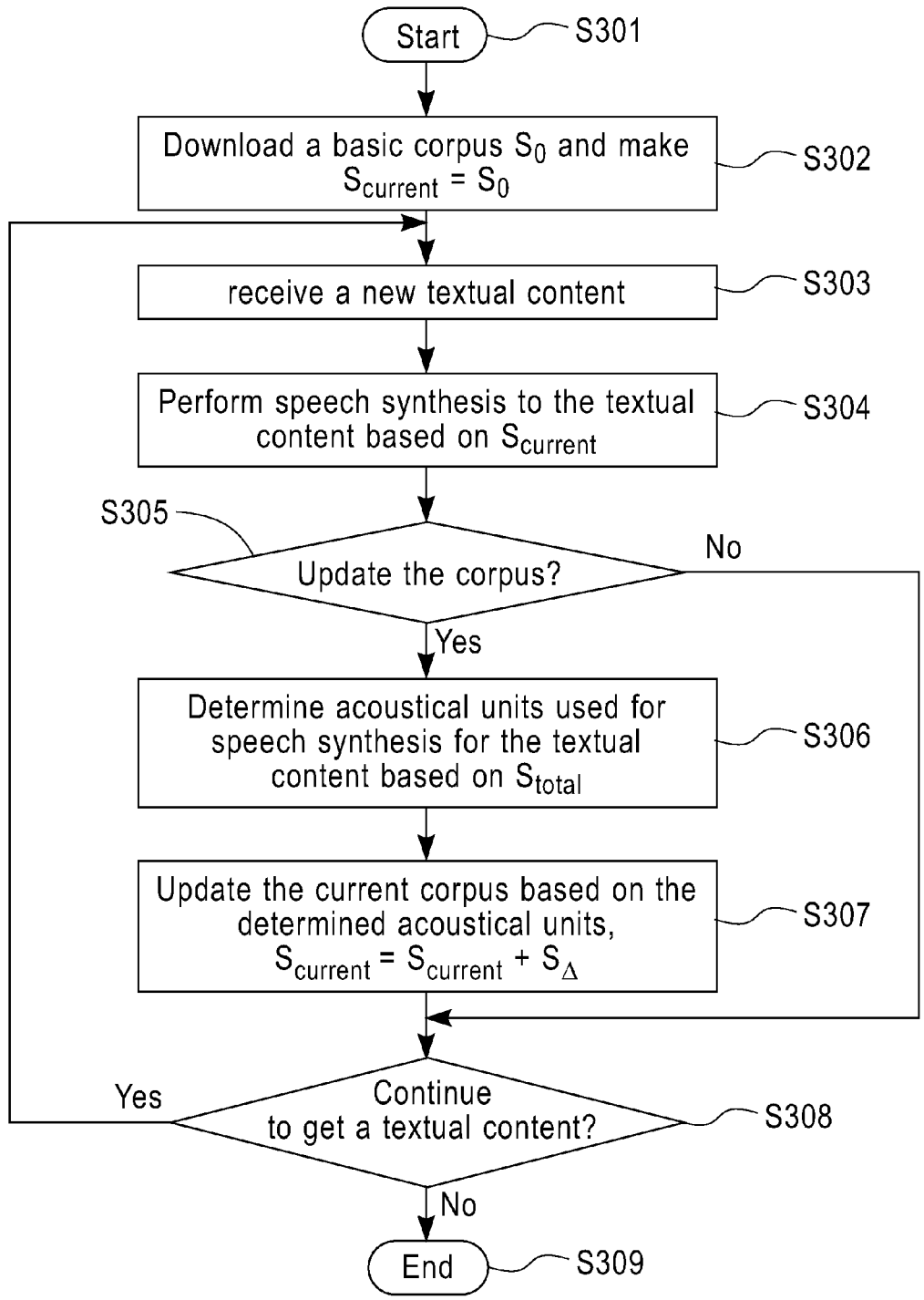
FIG. 3 shows a flowchart of a method for performing speech synthesis to a textual content at a client according to an embodiment of the present invention.

FIG. 3 shows a flowchart of a method for performing speech synthesis of textual content at a client according to an embodiment of the present invention.

For purposes of illustration, the symbols $S_{current}$, $S_0$, $S_{total}$ and $S_A$ are again used as defined above.

In step S301, a user starts the TTS service functionality, and thus the flow begins.

In step S302, the basic corpus So is downloaded to make $S_{current}=S_0$. This step can be performed when, for example, a client is initializing a TTS system. The client downloads the predefined basic corpus $S_0$ from a TTS server and uses $S_0$ as the client corpus $S_{current}$ for speech synthesis. This enables the user to use the TTS system without waiting for a long time.

In step S303, a new textual content is received. The client can receive all kinds of information including textual contents from a content server via a communications network.

In step S304, speech synthesis is performed on textual content based on $S_{current}$. The textual content is converted to speech through the selection and concatenation of acoustical units $S_{current}$ in the current corpus, and the speech is output via a loudspeaker.

In step S305, judgment is made as to whether to update the client corpus. Various conditions can be employed for the judgment.

For example, in a typical situation, if $S_{current}=S_{total}$, this indicates that the client corpus has gotten all available acoustical units, so it is determined that the client corpus does not need to be updated.

For another example, judgment can be made as to whether update the client corpus, through preset criteria (e.g. preset parameters such as a speech synthesis quality and so on) or even through the user's indication. The speech synthesis quality performed by the client TTS system will increase significantly in the initial stage of performing the corpus update solution according to the present invention, and such an increase in the speech synthesis quality will slow down or even stop in a later stage. At this point, if the user thinks that the speech synthesis quality is satisfactory, the client corpus does not needed to be updated. In this manner, computation resources at the client and/or on the TTS server side can be saved.

In other embodiments, the judgment in step S305 can be implemented at the TTS server side or locally at the client.

If the judgment is to update the client corpus, the flow goes to step S306. If the judgment is not to update the client corpus, the flow goes to step S308.

In step S306, an acoustical unit set for speech synthesis is determined for the textual content based on $S_{total}$. Depending on different embodiments, step S306 can be implemented at the TTS server side (the embodiment as shown in FIG. 1) or at the client (the embodiment as shown in FIG. 2).

In step S307, the client's current corpus is updated based on determined acoustical units. For example, in one implementation, only a set $S_A$ of acoustical units is gotten, which belongs to the acoustical unit set determined in step S306 and is not downloaded into the client corpus, and the set $S_A$ is added to the client corpus $S_{current}$ (i.e., $S_{current}=S_{current}+S_0$), so that the client's current corpus is updated for subsequent speech synthesis to use it.

In step S308, judgment is made as to whether to continue to get a textual content.

If the judgment is to continue to get a textual content, the flow returns to step S303, otherwise the flow goes to step S309.

The flow ends in step S309.

Figure 4:
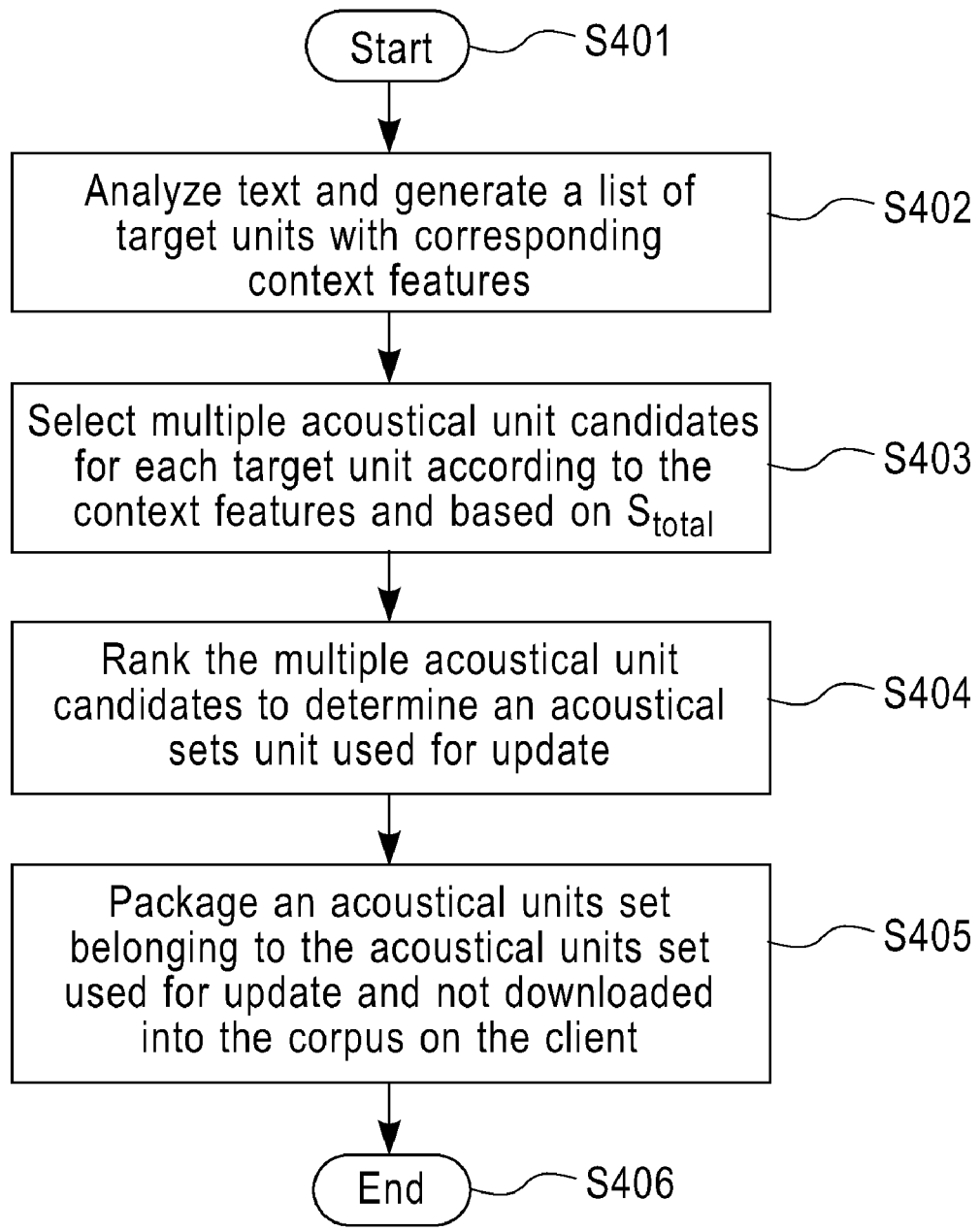
FIG. 4 shows a more detailed flowchart of a step of the method shown in FIG. 3.

Reference is now made to FIG. 4 in which a more detailed description is given of step S306 of determining acoustical units for the textual content based on $S_{total}$ in FIG. 3 with reference to FIG. 4.

The flow starts in step S401.

In step S402, the textual content is analyzed, and a list of target units with corresponding context features is generated. Here, the context features include: the current unit, position in the prosody word (head, middle or tail), position in the sentence, the left vowels, the right consonants, etc.

In step S403, multiple acoustical unit candidates are selected for each target unit according to the context features based on $S_{total}$. The selection procedure may be implemented based on the data processing speed of the device and the workload of a task.

If the data processing speed of the device (the TTS server or the client device) is fast enough, the device can be used to select the best acoustical unit candidates. It is similar to the unit selection procedure of the TTS system If the data processing speed of the device (the TTS server or the client device) is not fast enough, only a Target Cost method is used to select the best acoustical unit candidates. The device's text analysis means will predict the target prosody based on the target context features. The estimated prosody includes the target pitch and target duration. Then, the device's unit selection means will compare the difference between the target prosody and the unit candidates' prosody to get target cost, so as to select the best acoustical unit candidates.

If the data processing speed of the device (the TTS server or the client device) is slow, the context features are used directly as filtering criteria. In this case there are solution i and solution ii as described below.

Solution i. The acoustical unit candidates are ranked by comparing the context features between the target units and the acoustical unit candidates. For example, a set of distance tables can be used. Each table describes the distance between two features of one feature. This table can be manually designed or automatically trained (refer to "A Miniature Chinese TTS System Based On Tailored Corpus," Zhiwei Shuang, etc., ICSLP 2002).

Solution ii. A filtering process can be used to leave a small number of acoustical unit candidates. The filtering process can save the cost of ranking. Two solutions are described here by way of example:

1. The filtering process can be done with manually defined orders for each feature. For example, for Chinese, to find the position in the word is very important for syllable selection. So the position in the word can be used as the first filtering criterion to choose a set of acoustical unit candidates with the same "position in the word" with the target units. Then, another feature is used to filter the acoustical unit candidates until a predefined number of acoustical unit candidates are left.

2. The filtering process also can be done with an automatically trained decision tree. The decision tree is trained according to entropy reduction of the prosodic features. The first chosen split criterion is usually the most important feature. The decision tree goes down according to the target unit until a predefined number of unit candidates are left.

It is understood by those skilled in the art that, although examples of multiple embodiments where acoustical unit candidates are selected for target units of history textual information based on $S_{total}$ have been provided above, these examples are merely illustrative and should not be construed as limiting the present invention. As a matter of fact, any known manner in the art can be used to perform this step, because the technical solution of the present invention only focuses on a result of selecting acoustical unit candidates for target units of history textual information based on $S_{total}$, which result will be used as a basis for updating the client corpus.

In step S404, the multiple acoustical unit candidates as selected are ranked, and an acoustical unit set for update is determined. Based on the previous unit selection procedure, the multiple acoustical unit candidates are ranked to indicate the importance of each unit candidate for the history textual content, so that unit candidates with high importance are preferably (e.g. the first N acoustical unit candidates) included in the acoustical unit set for update. For example, the ranking can be implemented based on how many times each unit candidate has been selected. Two possible ranking solutions, i and ii, are illustrated:

Solution i. Multiple acoustical unit candidates of different target units are ranked together. Such a process can ensure that the most often used units are ranked first. However, it may have such risk that some frequently occurring units are always ranked in the front while some not frequently occurring units are always ranked behind. Therefore, such a solution may work well for a very limited domain, such as stock market report, bank service and so on. But it may not work well for a general domain, such as news.

Solution ii: Multiple acoustical unit candidates of different target units are ranked separately. The occurrence number of the $i^{th}$ target unit in history text $C_i$ can be used to decide the number of left acoustical unit candidate $A_i$. $A_i=f(C_i)$. $f(x)$ can be a linear function, a log function or other function. Different functions can be chosen for different usage scenarios.

Preferably, in step S405, the acoustical unit set $S_A$ which belongs to the acoustical unit set for update and has not been downloaded into the client corpus is packaged. The server downloads the package into the client to enrich $S_A$ of the client corpus. Speech information (audio waveform) and context information of each acoustical unit set will be included in this package.

The flow ends in step S406.

It is to be understood by those skilled in the art that, although speech compression has not been mentioned in the foregoing description, all procedures relating to transferring speech data (for example, transferring $S_A$) can use a speech encoding algorithm such as AMR-WB or the like to perform speech compression for transferring speech data, and speech data is used after being decompressed at the recipient side.

Figure 5:
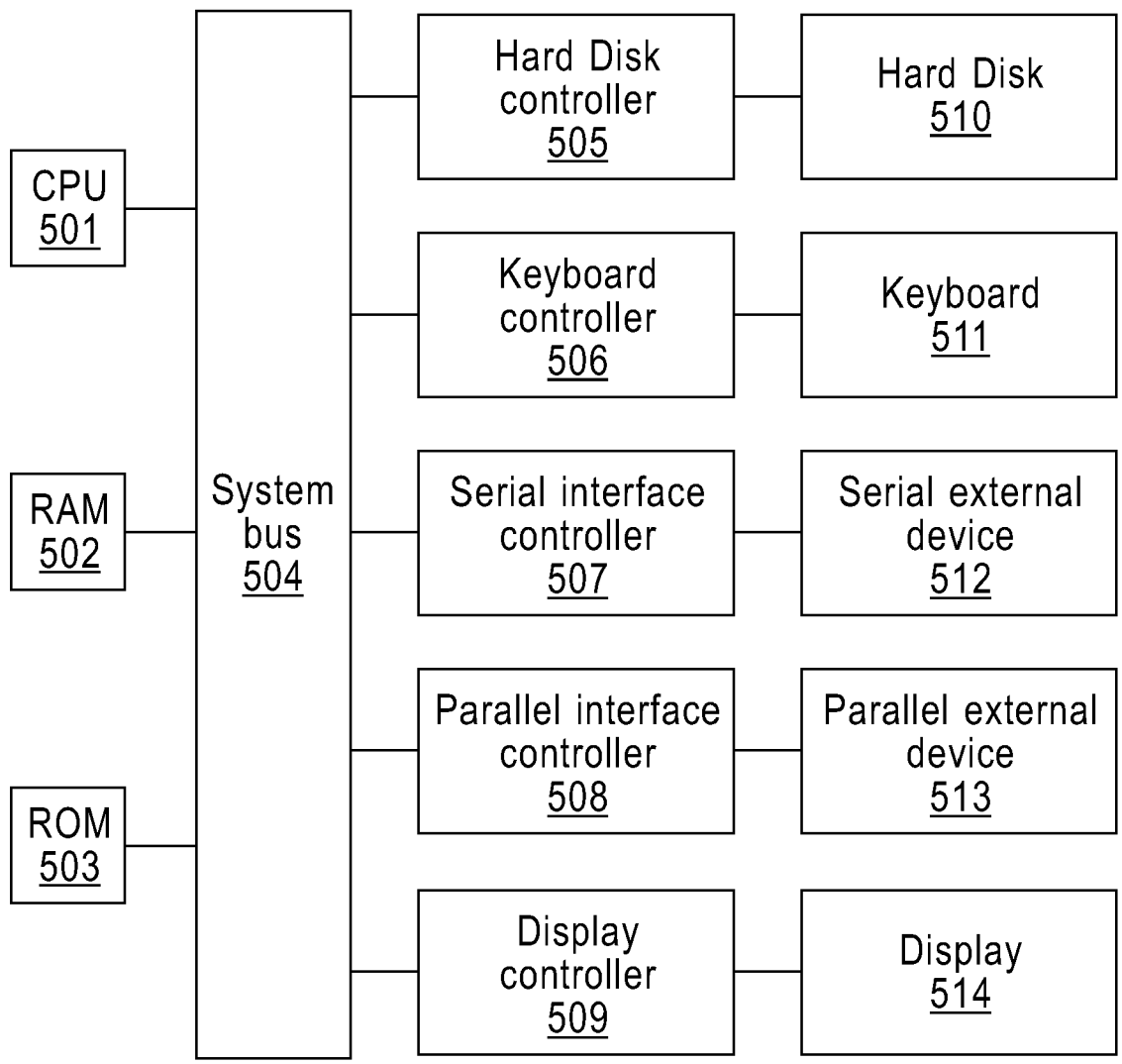
FIG. 5 schematically shows a computer device in which embodiments according to the present invention can be implemented.

FIG. 5 schematically shows a computer device in which the embodiments according to the present invention may be implemented.

The computer system shown in FIG. 5 comprises a CPU (Central Processing Unit) 501, a RAM (Random Access Memory) 502, a ROM (Read Only Memory) 503, a system bus 504, a Hard Disk controller 505, a keyboard controller 506, a serial interface controller 507, a parallel interface controller 508, a display controller 509, a hard disk 510, a keyboard 511, a serial external device 512, a parallel external device 513 and a display 514. CPU 501, RAM 502, ROM 503, HD controller 505, keyboard controller 506, serial interface controller 507, parallel interface controller 508 and display controller 509 are all connected to system bus 504. Hard disk 510 is connected to HD controller 505, and keyboard 511 to keyboard controller 506, serial external device 512 to serial interface controller 507, parallel external device 513 to parallel interface controller 508, and display 514 to display controller 509.

The functions of each component in FIG. 5 are well known in the art, and the architecture shown in FIG. 5 is conventional. Such architecture applies to not only personal computers but also hand held devices such as Palm PCs, PDAs (personal data assistants), mobile telephones, etc. In different applications, some components may be added to the architecture shown in FIG. 5, or some of the components shown in FIG. 5 may be omitted. The whole system shown in FIG. 5 is controlled by computer readable instructions, which are usually stored as software in hard disk 510, EPROM or other non-volatile memory. The software can also be downloaded from the network (not shown in the figure). The software, either saved in hard disk 510 or downloaded from the network, can be loaded into RAM 502, and executed by CPU 501 for implementing the functions defined by the software.

As the computer system shown in FIG. 5 is able to support the speech synthesis solution according to the present invention, the computer system merely serves as an example of computer systems. It is understood by those skilled in the art that many other computer system designs also can carry out the embodiments of the present invention.

The present invention may further be implemented as a computer program product used by, for example, the computer system shown in FIG. 5, which contains code for implementing the speech synthesis method according to the present invention. The code may be stored in a memory of other computer system prior to the usage. For instance, the code may be stored in a hard disk or a removable memory like an optical disk or a floppy disk.

As the embodiments of the present invention have been described with reference to the accompanying drawings, various modifications or alterations may be made by those skilled in the art within the scope as defined by the appended claims.

What is claimed is:

1. A method for performing speech synthesis of textual content at a client data processing system, the method comprising:
    performing speech synthesis of textual content based on a current acoustical unit set $S_{current}$ in a corpus at said client;
    analyzing said textual content and generating a list of target units with corresponding context features;
    selecting multiple acoustical unit candidates for each target unit according to said context features based on an acoustical unit set $S_{total}$ that is more plentiful than the current acoustical unit set $S_{current}$ in the corpus at said client;
    determining acoustical units suitable for speech synthesis for said textual content according to said multiple unit candidates; and
    updating the current acoustical unit set $S_{current}$ in the corpus at said client based on the determined acoustical units,
    wherein at least one of the performing, analyzing, selecting, determining and updating is performed by a processing device.

2. The method according to claim 1, further comprising the step of:
    downloading a set $S_0$ of a small number of acoustical units, which can perform speech synthesis to all kinds of textual contents and which can ensure an acceptable speech synthesis quality, as an initial current acoustical unit set in the corpus on said client to make $S_{current}=S_0$.

3. The method according to claim 1, wherein said step of determining acoustical units further comprises:
    ranking said multiple acoustical unit candidates to determine, according to importance for the textual content, an acoustical unit set for updating the current acoustical unit set in the corpus at said client.

4. The method according to claim 3, further comprising the step of:
    downloading into said client an acoustical unit set $S_\Delta$ which (i) belongs to the acoustical unit set used for update and (ii) is not included in the current acoustical unit set in the corpus at said client; and
    wherein the current acoustical unit set $S_{current}$ in the corpus on said client is updated by making $S_{current}=S_{current}+S_\Delta$ in said updating step.

5. The method according to claim 3, wherein the unit candidates are ranked based on how many times each unit candidate has been selected.

6. The method according to claim 5, wherein multiple acoustical unit candidates of different target units are ranked together.

7. The method according to claim 5, wherein multiple acoustical unit candidates of each target unit are ranked separately.

8. A system having at least one processing device for enabling speech synthesis of textual content at a client data processing system, the system comprising:
    speech synthesis means configured to perform speech synthesis of textual content based on a current acoustical unit set $S_{current}$ in a corpus on said client;
    analysis means configured to analyze said textual content and generate a list of target units with corresponding context features;
    selection means configured to select multiple acoustical unit candidates for each target unit according to said context features based on an acoustical unit set $S_{total}$ that is more plentiful than the current acoustical unit set $S_{current}$ in the corpus at said client;
    determining means configured to determine acoustical units suitable for speech synthesis for said textual content according to said multiple unit candidates; and
    update means configured to update the current acoustical unit set $S_{current}$ in the corpus on said client based at the determined acoustical units.

9. The system according to claim 8, further comprising:
    means configured to download a set $S_0$ of a small number of acoustical units which can perform speech synthesis to all kinds of textual contents and which can ensure an acceptable speech synthesis quality, as an initial current acoustical unit set in the corpus on said client to make $S_{current}=S_0$.

10. The system according to claim 8, wherein said determining means comprises:
    means to rank said multiple acoustical unit candidates to determine, according to importance for the textual content, an acoustical unit set for updating the current acoustical unit set in the corpus at said client.

11. The system according to claim 10, wherein said determining means further comprises:
    means for determining an acoustical unit set $S_\Delta$ which (i) belongs to the acoustical unit set used for update and (ii) is not included in the current acoustical unit set in the corpus at said client; and
    wherein said update means is configured to update the current acoustical unit set $S_{current}$ in the corpus on said client by making $S_{current}=S_{current}+S_\Delta$.

12. The system according to claim 10, wherein said determining means is configured to rank the unit candidates based on how many times each unit candidate has been selected.

13. The system according to claim 12, wherein said determining means comprises means to rank multiple acoustical unit candidates of different target units together.

14. The system according to claim 12, wherein said determining means comprises means to separately rank multiple acoustical unit candidates of each target unit.

* * * * *